(12) United States Patent
Masuda et al.

(10) Patent No.: US 7,379,236 B2
(45) Date of Patent: May 27, 2008

(54) OPTICAL FIBER COMMUNICATION SYSTEM USING REMOTE PUMPING

(75) Inventors: Hiroji Masuda, Yokosuka (JP); Hiroto Kawakami, Yokosuka (JP); Yutaka Miyamoto, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 134 days.

(21) Appl. No.: 10/552,554

(22) PCT Filed: Jul. 5, 2004

(86) PCT No.: PCT/JP2004/009878

§ 371 (c)(1),
(2), (4) Date: Oct. 12, 2005

(87) PCT Pub. No.: WO2005/004356

PCT Pub. Date: Jan. 13, 2005

(65) Prior Publication Data

US 2007/0003286 A1    Jan. 4, 2007

(30) Foreign Application Priority Data

Jul. 4, 2003    (JP)    ............................. 2003-271157

(51) Int. Cl.
*H01S 4/00*    (2006.01)
*H04B 10/12*    (2006.01)

(52) U.S. Cl. ............................... 359/341.32; 359/341.3

(58) Field of Classification Search ............. 359/341.3, 359/341.32

See application file for complete search history.

(56) References Cited

U.S. PATENT DOCUMENTS 5,321,707 A  *  6/1994  Huber ........................... 372/6

5,903,385 A       5/1999  Sugaya et al.

(Continued)

FOREIGN PATENT DOCUMENTS

JP          05-129685         5/1993

(Continued)

OTHER PUBLICATIONS

K. Aida et al., "1.8Gb/s 310 km Fiber Transmission Without Outdoor Repeater Equipment Using a Remotely Pumped In-Line Er-Doped Fiber Amplifer in an IM/Direct-Detection System", Proc. of ECOC, PDA-7, pp. 29-32, 1989.

(Continued)

*Primary Examiner*—Jack Keith
*Assistant Examiner*—Eric Bolda
(74) *Attorney, Agent, or Firm*—Harness, Dickey & Pierce, PLC (57) ABSTRACT

An optical fiber communication system is provided which uses remote pumping that is capable of improving pumping efficiency and reducing a noise figure. A coupler (20) of a linear repeater (18) couples signal light to pumping light outputted from a pumping light source (19). The outputted signal light and pumping light reach a linear repeater (25) through transmission fibers (22 to 24) and remote pumping modules (27F and 27R). A coupler (30) of the linear repeater (25) couples the signal light to the pumping light supplied from a pumping light source (29), to output the signal light and the pumping light to the transmission fiber (24). The remote pumping module (27F) divides the pumping light propagated in the transmission fiber (22), from the signal light. The remote pumping module 27F branches the divided pumping light in two directions with a predetermined ratio. After branching, each of the branched pumping light is coupled to the signal light to be supplied to both ends of an erbium-doped fiber. The remote pumping module (27R) is similar in structure to the remote pumping module (27F).

3 Claims, 5 Drawing Sheets

U.S. PATENT DOCUMENTS

| | | | |
|---|---|---|---|
| 6,111,686 A * | 8/2000 | Toyohara | 359/337.13 |
| 6,243,195 B1 * | 6/2001 | Pedersen et al. | 398/9 |
| 6,263,139 B1 * | 7/2001 | Kawakami et al. | 385/123 |
| 6,320,694 B1 | 11/2001 | Ohshima et al. | |
| 6,344,922 B1 * | 2/2002 | Grubb et al. | 359/334 |
| 6,359,728 B1 | 3/2002 | Angellieri et al. | |
| 6,365,891 B1 * | 4/2002 | Hodgson et al. | 250/227.14 |
| 6,426,833 B1 * | 7/2002 | Bao | 359/341.32 |
| 6,433,926 B2 * | 8/2002 | Pedersen et al. | 359/341.43 |
| 6,507,431 B1 * | 1/2003 | Sugaya et al. | 359/341.32 |
| 6,507,679 B1 * | 1/2003 | Hodgson et al. | 385/12 |
| 6,643,057 B2 * | 11/2003 | Vasilyev et al. | 359/341.3 |
| 6,661,947 B2 * | 12/2003 | Shirai | 385/24 |
| 2002/0008901 A1 * | 1/2002 | Kinoshita | 359/341.1 |
| 2003/0174390 A1 * | 9/2003 | Kakui | 359/341.3 |

FOREIGN PATENT DOCUMENTS

| | | |
|---|---|---|
| JP | 05-224254 | 9/1993 |
| JP | 07-162371 | 6/1995 |
| JP | 10-209540 | 8/1998 |
| JP | 10-257028 | 9/1998 |
| JP | 11-121849 | 4/1999 |
| JP | 2000-101174 A | 4/2000 |
| JP | 2001-109025 | 4/2001 |
| JP | 2001-196672 A | 7/2001 |
| JP | 2003-050409 A | 2/2003 |
| JP | 2003-110178 | 4/2003 |
| JP | 2003-124551 A | 4/2003 |
| JP | 2003-283019 | 10/2003 |

OTHER PUBLICATIONS

N. Ohkawa, et al., "Large Capacity Submarine Repeaterless Transmission System Design Employing Remote Pumping", IEICE Trans, Commun., vol. E81-B, pp. 586-596, 1998.

H. Masuda, et al., "First field trail using novel two-stage remotely-pumped EDF/distributed Raman hybrid inline amplifiers with 1.28-Tbit/s (32×43 Gbit/s) capacity over 528-km (6×88 km) DSF in the L-band", Technical Digest of Optical Amplifiers and Their Applications, Optical Society of America Topical Meetings, PD2-1—PD2-4, Jul. 6-9, 2003.

* cited by examiner

OPTICAL FIBER COMMUNICATION SYSTEM USING REMOTE PUMPING

TECHNICAL FIELD

This invention relates to an optical fiber communication system using remote pumping for amplifying an optical signal by a passive remote pumping module which is apart from a linear repeater and a terminal device and which is installed in a constructed optical fiber which is a transmission path for the optical signal.

Priority is claimed on Japanese Patent Application No. 2003-271157, filed on Jul. 4, 2003, the contents of which are incorporated herein by reference.

BACKGROUND ART

Figure 8:
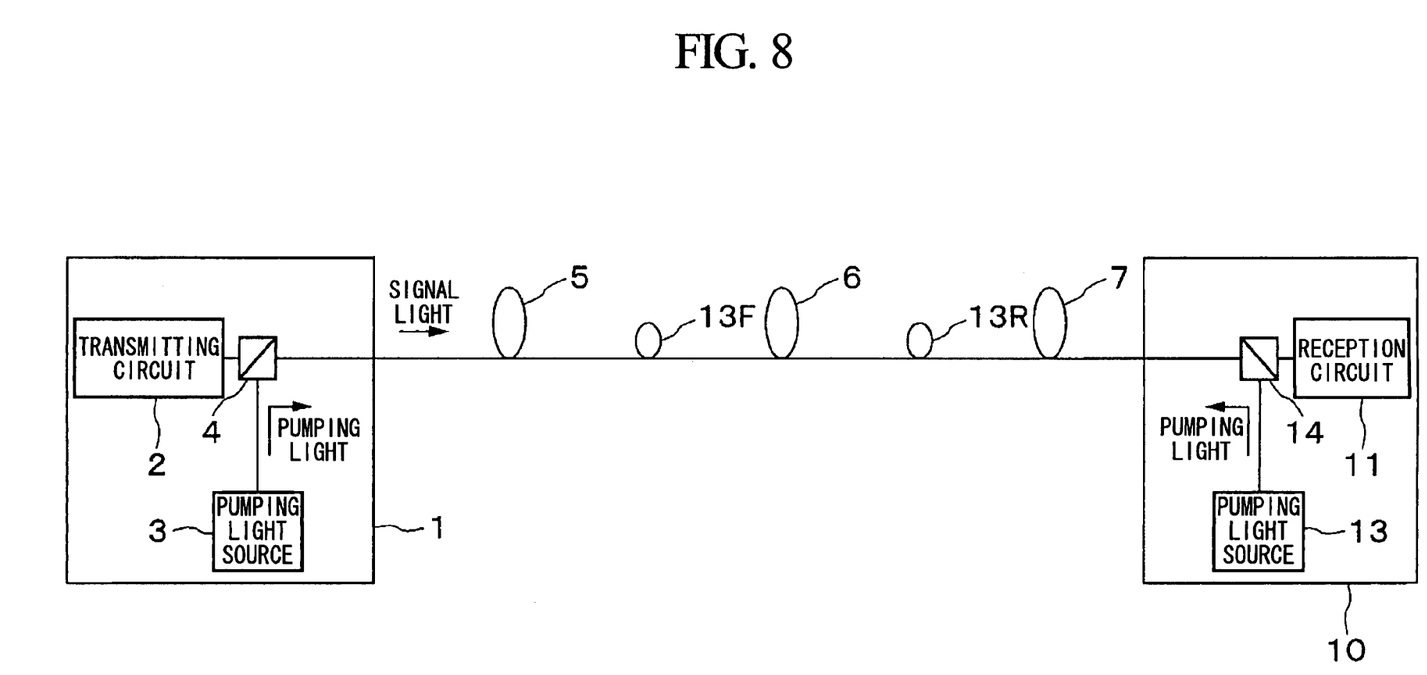
FIG. 8 is a block diagram illustrating a configuration of a conventional optical fiber communication system.

FIG. 8 is a configuration example illustrating a conventional remote pumping system which is used in a wavelength division multiplexing optical fiber communication system (referring to K. Aida et al., Proc. Of ECOC, PDA-7, pp. 29-32, 1989 and N. Ohkawa et al., IEICE Trans. Commun., Vol. E81-B, pp. 586-596, 1998). In this remote pumping system, signal light is transmitted from a transmitting circuit 2 of a transmitter 1 and is received by a reception circuit 11 of a receiver 10 via three transmission fibers 5 to 7. Erbium-doped fibers (EDFs) 13F and 13R are positioned between the transmission fiber 5 and the transmission fiber 6 and between the transmission fiber 6 and the transmission fiber 7, respectively. Remote pumping light sources 3 and 13 are located in the transmitter 1 and receiver 10, respectively. The signal light is coupled to the pumping light supplied from the pumping light source 3, by a coupler 4. Furthermore, the signal light is coupled to the pumping light supplied from the pumping light source 13, by a coupler 14. Each of the transmitter 1, the receiver 10, and the pumping light sources 3 and 13 is connected to power source to be supplied with a power. The pumping light sources 3 and 13 adjacent to the transmitter 1 and the receiver 10 will be called a front stage pumping light source and a rear stage pumping light source, respectively. In addition, the pumping light supplied from the pumping light sources 3 and 13 will be called a forward pumping light and a backward pumping light, respectively. After passing through the transmission fiber 5, the forward pumping light pumps the EDF 13F. After passing through the transmission fiber 7, the backward pumping light pumps the EDF 13R.

Each pumping light has a wavelength near 1.48 μm which is appropriate for pumping the EDF. The signal light outputted from the transmitter 1 is attenuated in the transmission fiber 5 and is amplified in the EDF 13F. Furthermore, the signal light is attenuated in the transmission fiber 6 and is amplified in the EDF 13R. After passing through the transmission fiber 7, the signal light is received by the receiver 10. Under such circumstances, it is possible to un-repeatedly transmit the signal light over the entire length of the transmission fibers 5, 6, and 7, without supplying power on the way. In comparison to a repeating system which does not use the remotely pumped EDFs 13F and 13R, there is an advantage in greatly enlarging the un-repeated distance, namely, repeater spacing, in the above-mentioned remote pumping. Incidentally, it is possible to adopt either one of a configuration using the forward pumping light source 3 and EDF 13F and a configuration using the backward pumping light source 13 and EDF 13R. In addition, a certain degree of distributed gain (Raman gain) is given to the signal light, since the signal light is generally subjected to Raman amplification in the transmission fiber in which the pumping light is propagated.

In the conventional remote pumping system illustrated in FIG. 8, the pumping light, which reaches the EDFs 13F and 13R, travels from the pumping light input ends of EDFs 13F and 13R to the pumping light output ends of EDF 13F and 13R that are positioned at opposite sides of the pumping light input ends, since the gain wavelength region is set to C band (1530 nm to 1560 nm) of EDFA in the signal light. As a result, the pumping light pumps the EDFs 13F and 13R across the entire fiber lengths, respectively.

However, it has been found that the pumping light, which reaches the EDFs 13F and 13R, only pumps to the vicinities of pumping light input ends of EDFs 13F and 13R and almost none travels to the opposite pumping light output ends, in the case where the gain wavelength region is set to L band (1570 nm to 1600 nm) of EDFA in the signal light. Since the EDF for the L band has a length which is several times as long as the length of EDF for C band, the pumping light reaches only the vicinity of the pumping light input end. In addition, absorption occurs in the part of EDF that is not pumped, except in the vicinity of the pumping light input end. As a result, there is a problem in that the pumping efficiency is reduced in each of the EDFs 13F and 13R and the noise figure increases in each of the EDFs 13F and 13R. Incidentally, the L band is a gain wavelength region for signal light and is as important as the C band. More particularly, the L band is an important gain wavelength region for signal light since it is possible to prevent the four-wave mixing, which is a problem in the C band, in a system using a dispersion-shifted fiber (DSF).

DISCLOSURE OF INVENTION

This invention has been made taking the above-mentioned circumstances into consideration, and it is an object of this invention to provide an optical fiber communication system using remote pumping that is capable of improving pumping efficiency and reducing a noise figure.

In order to solve the above-mentioned problems, a first aspect of this invention is an optical fiber communication system comprising: signal light output device which comprises a pumping light source which outputs pumping light and a coupler which couples the pumping light to signal light; a plurality of transmission fibers which transmit the signal light outputted from the signal light output device; an erbium-doped fiber module which is positioned between the transmission fibers; and a signal light reception device which receives the signal light which is outputted from the signal light output device and which passes through the transmission fibers and the erbium-doped fiber module, wherein the erbium-doped fiber module comprises: a divider which divides the pumping light propagated in a direction the same as that in which the signal light is propagated in the transmission fibers, from the signal light; a branch which branches the pumping light divided by the divider in two direction, at a predetermined ratio; an erbium-doped fiber to which the signal light passing through the divider is inputted; and first and second coupling devices which couple the signal light to the pumping light branching off from the branch, to supply outputs of the first and the second coupling device to both ends of the erbium-doped fiber.

A second aspect of this invention is an optical fiber communication system comprising: a signal light output device which outputs signal light; a plurality of transmission fibers which transmit the signal light outputted from the signal light output device; an erbium-doped fiber module which is positioned between the transmission fibers; and a signal light reception device which comprises: a pumping light source which outputs pumping light; and a coupler which couples the pumping light to the signal light which is outputted from the signal light output device and which passes through the transmission fibers and the erbium-doped fiber module, to output the pumping light in a direction opposite to that in which the signal light is outputted, wherein the erbium-doped fiber module comprises: a divider which divides the pumping light propagated in the direction opposite to that in which the signal light is propagated in the transmission fibers, from the signal light; a branch which branches the pumping light divided by the divider in two directions, with a predetermined ratio; an erbium-doped fiber to which the signal light is inputted; and first and second coupling devices which couple the signal light to the pumping light branching off from the branch, to supply outputs of the first and the second coupling devices to both ends of the erbium-doped fiber.

A third aspect of this invention is an optical fiber communication system comprising: a signal light output device which comprises a pumping light source which outputs pumping light and a coupler which couples the pumping light to signal light; a plurality of transmission fibers which transmit the signal light outputted from the signal light output device; an erbium-doped fiber module which is positioned between the transmission fibers; and a signal light reception device which receives the signal light which is outputted from the signal light output device and which passes through the transmission fibers and the erbium-doped fiber module, wherein the erbium-doped fiber module comprises: a circulator to which the signal light and the pumping light are inputted; a first erbium-doped fiber to which the signal light and the pumping light passing through the circulator are inputted; and a mirror to which the signal light and the pumping light passing through the first erbium-doped fiber are inputted, and wherein the signal light and the pumping light reflected by the mirror are outputted to a next stage through the first erbium-doped fiber and the circulator.

In the third aspect of this invention, a second erbium-doped fiber may be positioned at a front stage of the circulator.

A fourth aspect of this invention is an optical fiber communication system comprising: a signal light output device which outputs signal light; a plurality of transmission fibers which transmits the signal light outputted from the signal light output device; an erbium-doped fiber module which is positioned between the transmission fibers; and a signal light reception device which comprises: a pumping light source which outputs pumping light; and a coupler which couples the pumping light to the signal light which is outputted from the signal light output device and which passes through the transmission fibers and the erbium-doped fiber module, to output the pumping light in a direction opposite to that in which the signal light is outputted, wherein the erbium-doped fiber module comprises: a circulator to which the signal light is inputted; a divider which divides the pumping light from the signal light; a coupler which couples the pumping light divided by the divider, to the signal light outputted from the circulator; a first erbium-doped fiber to which the signal light and the pumping light outputted from the coupler are inputted; and a mirror to which the signal light and the pumping light passing through the first erbium-doped fiber are inputted, and wherein the signal light and the pumping light reflected by the mirror are outputted to a next stage through the first erbium-doped fiber and the circulator.

In the fourth aspect of this invention, a second erbium-doped fiber may be positioned at a front stage of the circulator, and the coupler may be positioned at a front stage of the second erbium-doped fiber.

According to this invention, it is possible to improve pumping efficiency in the remote pumping module and to reduce a noise figure in the remote pumping module in comparison to the conventional system, since the pumping light is inputted from both ends of the erbium-doped fiber. Incidentally, this invention is not limited to application of the L band although this invention is of great value in the case where the gain wavelength region of the signal light is set to the L band of EDFA. This invention also has an effect when the gain wavelength region of the signal light is set to, for example, C band of EDFA.

BEST MODE FOR CARRYING OUT THE INVENTION

Figure 1:
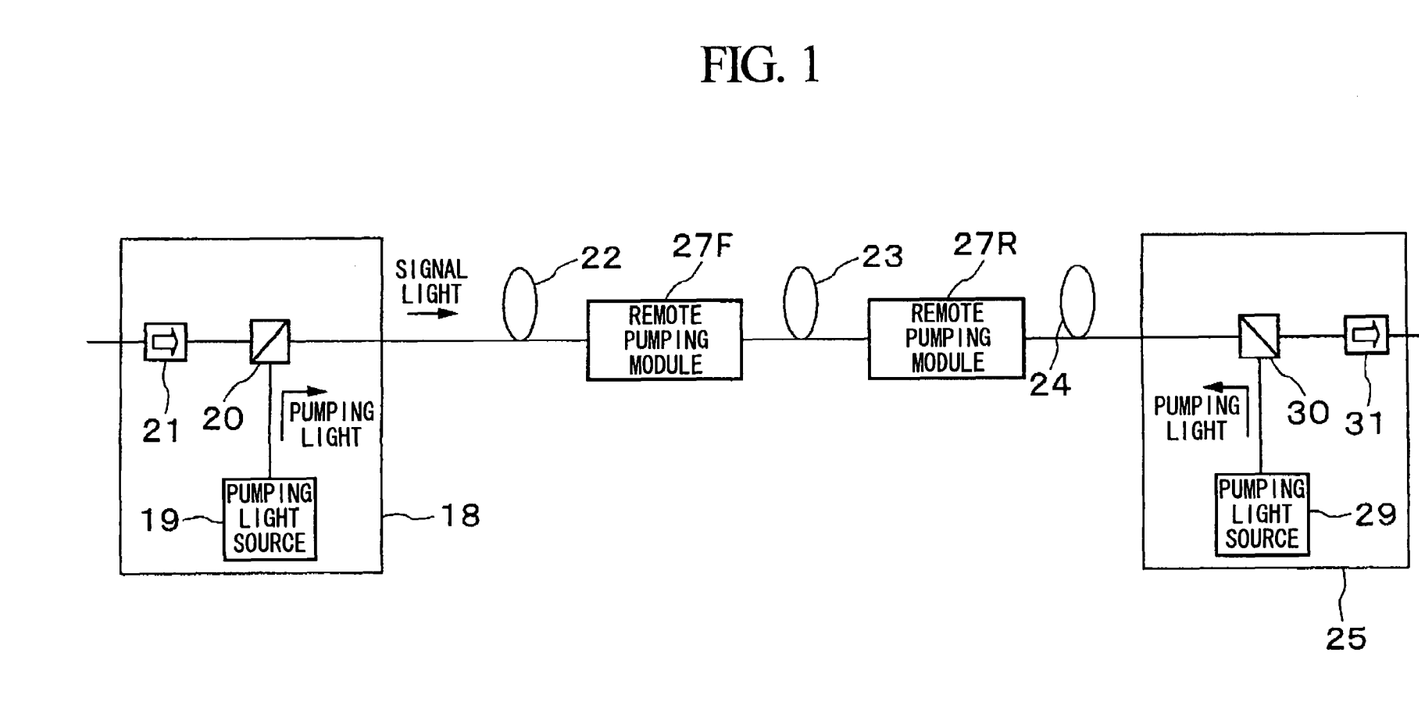
FIG. 1 is a block diagram illustrating a configuration of an optical fiber communication system according to a first embodiment of this invention.

Description will be made as regards embodiments of this invention with reference to drawings hereinafter. FIG. 1 is a block diagram illustrating a configuration of an optical fiber communication system according to a first embodiment of this invention. In FIG. 1, a linear repeater 18 comprises a pumping light source 19 for generating pumping light, a coupler 20 for coupling the pumping light to signal light, and an isolator 21 for reducing multi-path interference noise. The signal light outputted from the linear repeater 18 reaches a downstream linear repeater 25 via transmission fibers 22 to 24. A remote pumping module 27F is located between the transmission fibers 22 and 23. A remote pumping module 27R is located between the transmission fibers 23 and 24. The linear repeater 25 comprises a pumping light source 29 for generating pumping light, a coupler 30 for coupling the pumping light to the signal light, and an isolator 31.

Although an optical amplifier is installed in the linear repeater in a known linear repeater system, no optical amplifier is installed in the linear repeater in the present embodiment. In the present embodiment, it is possible to compensate for the sum of losses which occur in the transmission fibers 22 to 24, since each of the remote pumping modules 27F and 27R has a sufficiently large gain and the sum of distributed Raman gains is sufficiently large in the transmission fibers 22 and 24. Incidentally, the linear repeater 18 may be, for example, a transmitter and the linear repeater 25 may be, for example, a receiver. In other words, the linear repeater or the transmitter functions as signal light outputting means for outputting the signal light. The linear repeater or the receiver functions as signal light reception means for receiving the signal light.

Figure 2:
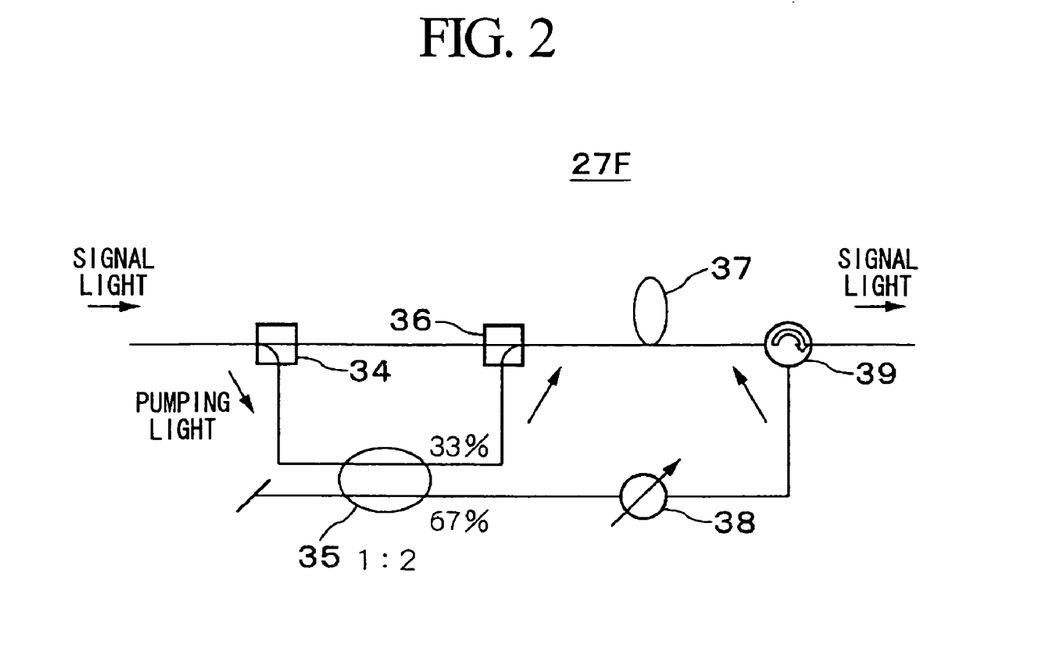
FIG. 2 is a block diagram illustrating a configuration of a remote pumping module 27F in the first embodiment of this invention.

FIG. 2 is a diagram illustrating a configuration of the remote pumping module 27F. In the remote pumping module 27F, a divider 34 divides the pumping light propagated together with the signal light in a same direction, from the signal light. A branching fiber coupler (FC) 35 makes the divided pumping light branch in a predetermined branching ratio. In the example being illustrated, the branching ratio is one to two. The pumping light of 33%, which is branched by the branching fiber coupler 35, is coupled to the signal light by a coupler 36 which is adjacent to the branching fiber coupler 35, to be inputted from a forward direction to an EDF 37. On the other hand, the pumping light of 67%, which is branched by the branching fiber coupler 35, is suitably attenuated by a variable attenuator (ATT) 38 which is adjacent to the branching fiber coupler 35, to be inputted from a backward direction to the EDF 37 by a circulator (CIR) 39 which is adjacent to the variable attenuator 38.

Incidentally, it is further preferable to use the circulator 39 although an optical coupler may be used instead of the circulator 39. More specifically, the circulator functions as aft optical coupler and isolator. Since the circulator interrupts returned light based on a residual reflection, by the isolator function, it is possible to remove multi-path interference noise which occurs on the basis of the returned light, in a case where the returned light is not interrupted. An isolator described hereinafter has the same function as described above.

Figure 3:
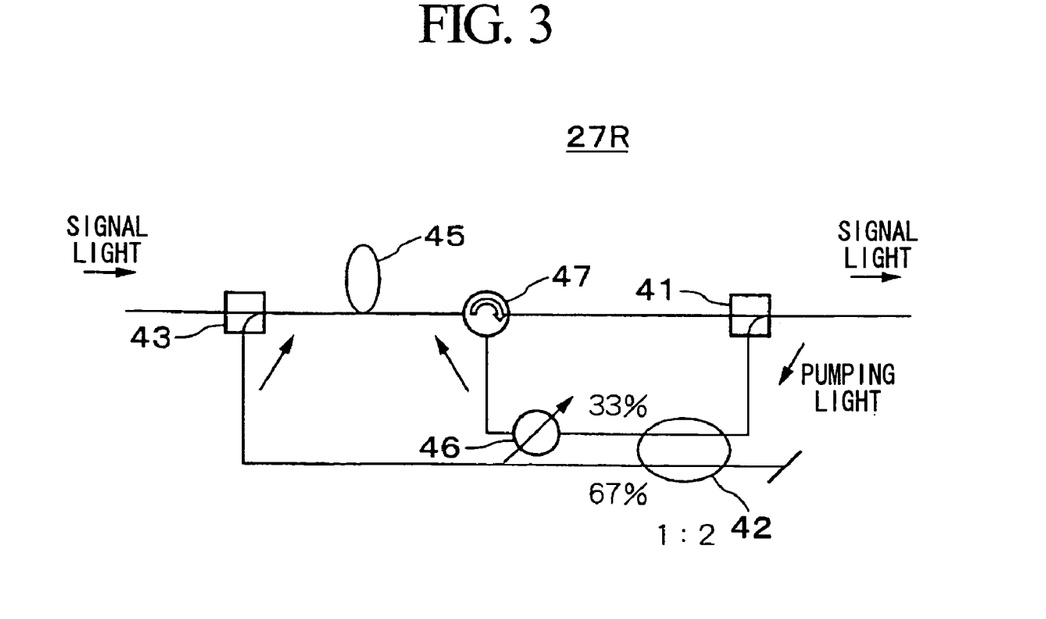
FIG. 3 is a block diagram illustrating a configuration of a remote pumping module 27R in the first embodiment of this invention.

FIG. 3 is a diagram illustrating a configuration of the remote pumping module 27R. In the remote pumping module 27R, a divider 41 divides the pumping light transmitted to the module 27R in a direction opposite to that in which the signal light is transmitted, from the signal light. A branching fiber coupler 42 makes the divided pumping light branch in a predetermined branching ratio. In the example being illustrated, the branching ratio is one to two. The pumping light of 67%, which is branched by the branching fiber coupler 42, is coupled to the signal light by a coupler 43 which is adjacent to the branching fiber coupler 42, to be inputted from a forward direction to the EDF 45. On the other hand, the pumping light of 33%, which is branched by the branching fiber coupler 42, is suitably attenuated by a variable attenuator 46 which is adjacent to the branching fiber coupler 42, to be inputted from a backward direction to the EDF 45 by a circulator 47 which is adjacent to the variable attenuator 46.

Since each of the EDFs 37 and 45 is supplied with the pumping light in two directions with the predetermined branching ratio according to the configurations of the above-mentioned remote pumping modules 27F and 27R, the pumping efficiency is enhanced in each of the EDFs 37 and 45 and the noise figure is reduced in comparison to conventional techniques.

Incidentally, the variable attenuators 38 and 46 are for use in adjusting the branching ratio in the remote pumping modules 27F and 27R, respectively, in order to pump the EDFs 37 and 45 in accordance with the predetermined branching ratios. Accordingly, it is possible to omit the variable attenuators 38 and 45 when the branching ratios are known in advance.

In addition, the above-mentioned branching ratio of 67% to 33% is an example. The predetermined branching ratio is determined on the basis of the pumping efficiency and a noise property of each remote pumping module. Each of the pumping efficiency and the noise property is one of the parameters which are used in determining a noise performance in the optical fiber communication system. More specifically, the noise property of the remote pumping module becomes better as the ratio of the forward direction increases and the pumping efficiency of the remote pumping module becomes better as the ratio of the backward direction increases with respect to the branching ratio, when the input and output directions of signal light are determined as the forward and backward directions, respectively.

When installing the variable attenuators 38 and 46 as described above, it is possible to adjust the branching ratio in each remote pumping module. As a result, there is an advantage in which it is sufficient to prepare the remote pumping modules similar to each other.

Next, a description of a second embodiment of this invention will be given.

Figure 4:
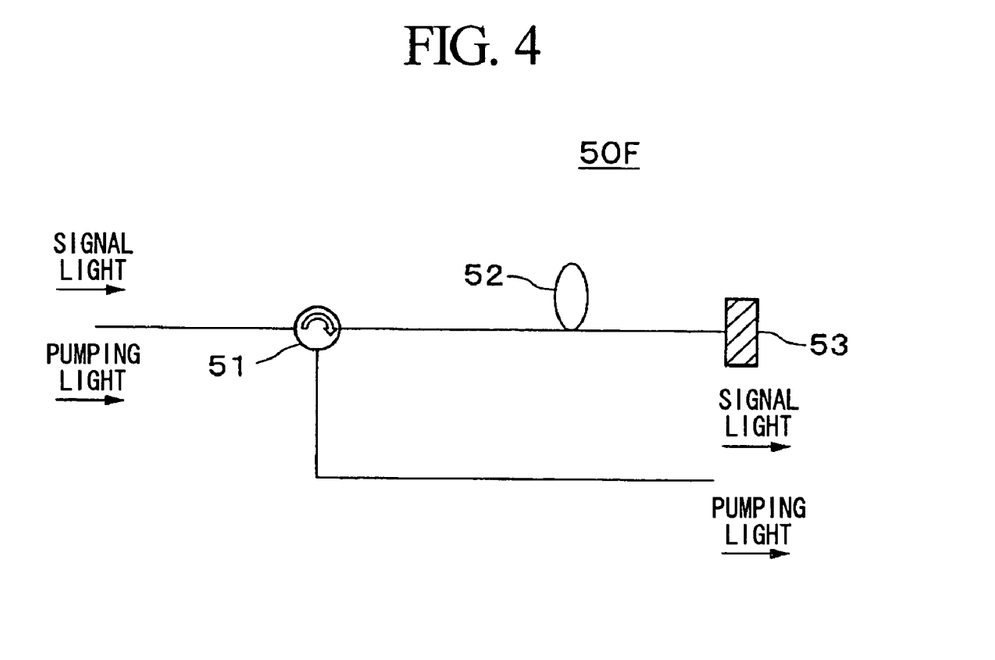
FIG. 4 is a block diagram illustrating a configuration of a remote pumping module 50F in an optical fiber communication system according to a second embodiment of this invention.
Figure 5:
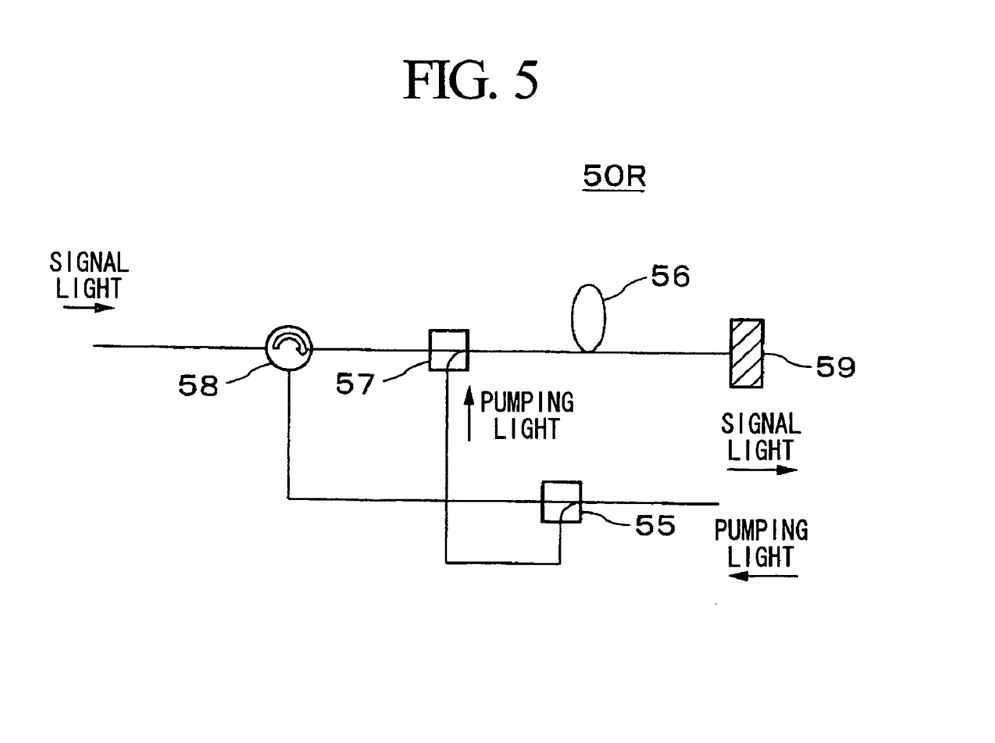
FIG. 5 is a block diagram illustrating a configuration of a remote pumping module 50R in the second embodiment of this invention.

A system of the second embodiment is similar in configuration to the system of FIG. 1 except that remote pumping modules of the second embodiment are different in structure from the remote pumping modules 27F and 27R of the first embodiment. FIG. 4 is a diagram illustrating a configuration of a remote pumping module 50F which is positioned between the transmission fibers 22 and 23 in FIG. 1. FIG. 5 is a diagram illustrating a configuration of a remote pumping module 50R which is positioned between the transmission fibers 23 and 24 in FIG. 1.

In the remote pumping module 50F illustrated in FIG. 4, the signal light and the pumping light are inputted to an EDF 52 through first and second ports of a circulator 51. After passing through the EDF 52, the signal light and pumping light are reflected by a mirror 53 and pass through the EDF 52 in a direction opposite to the above-mentioned direction. After that, the signal light and pumping light pass through a third port of the circulator 51 and are outputted from the module.

In the remote pumping module 50R illustrated in FIG. 5, a divider 55 divides the pumping light transmitted to the module 50R in a direction opposite to that in which the signal light is transmitted, from the signal light. The divided pumping light is inputted to a coupler 57 which is adjacent to an EDF 56. The signal light passes through a second port of a circulator 58 and is coupled to the above-mentioned pumping light in the coupler 57. The signal light and the pumping light, which are outputted from the coupler 57, are inputted to the EDF 56. After passing through the EDF 56, the signal light and the pumping light are reflected by a mirror 59 and pass through the EDF 56 in a direction opposite to the above-mentioned direction. After that, the signal light and the pumping light pass through a third port of the circulator 56 and are outputted from the module through the divider 55.

According to the configurations of the above-mentioned remote pumping modules 50F and 50R, it is possible to construct each of the modules with a decreasing number of parts in comparison to the first embodiment. Since the second embodiment uses a double path configuration having a high pumping efficiency, with respect to the signal light, it is possible to obtain a high pumping efficiency which is not less than the pumping efficiency of the first embodiment.

Next, a description of a third embodiment of this invention will be given.

Figure 6:
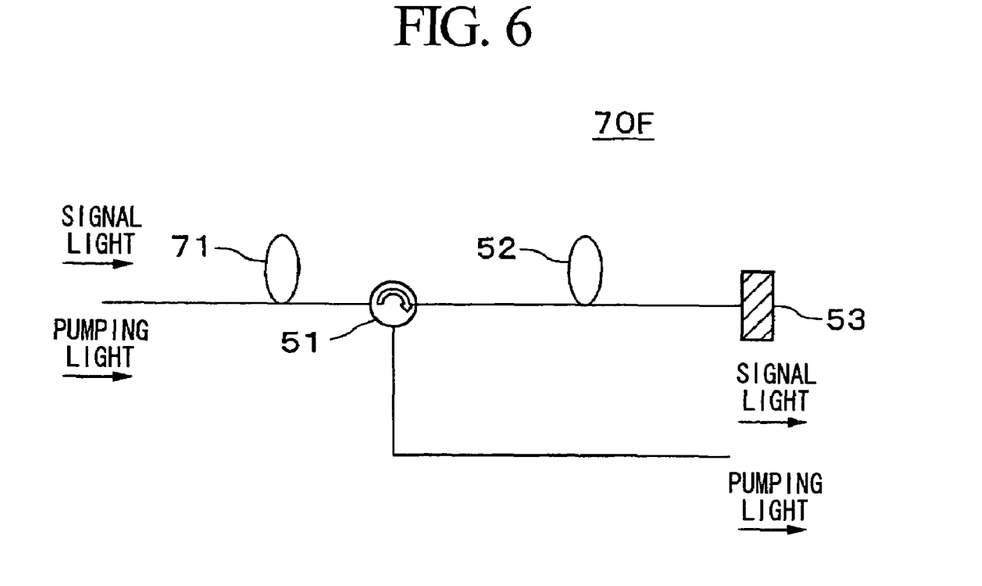
FIG. 6 is a block diagram illustrating a configuration of a remote pumping module 70F in an optical fiber communication system according to a third embodiment of this invention.
Figure 7:
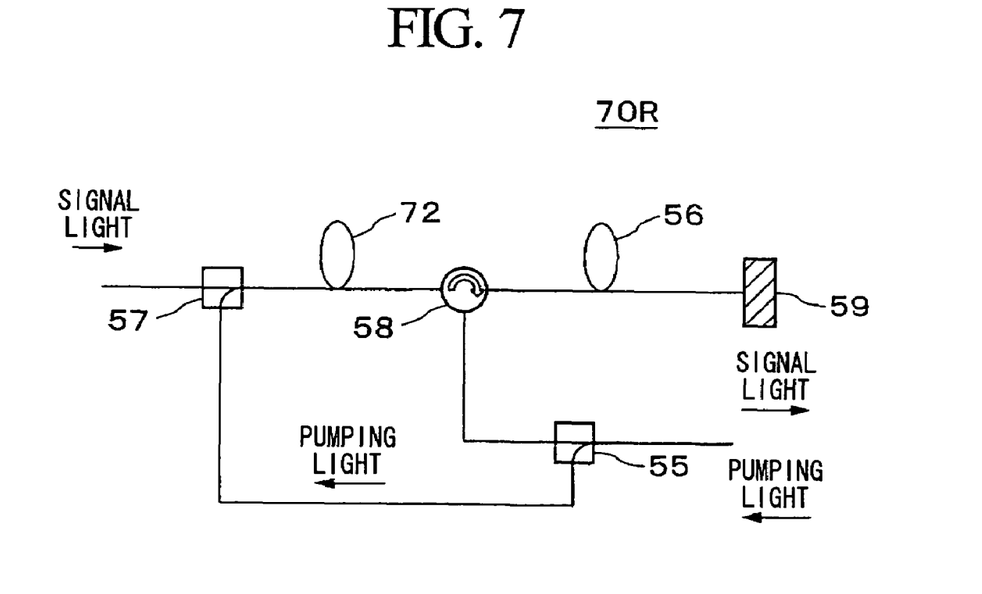
FIG. 7 is a block diagram illustrating a configuration of a remote pumping module 70R in the third embodiment of this invention.

A system of the third embodiment is similar in configuration to the system of FIG. 1 except that remote pumping modules of the third embodiment are different in structure from the remote pumping modules 27F and 27R of the first embodiment. FIG. 6 is a diagram illustrating a configuration of a remote pumping module 70F which is positioned between the transmission fibers 22 and 23 in FIG. 1. FIG. 7 is a diagram illustrating a configuration of a remote pumping module 70R which is positioned between the transmission fibers 23 and 24 in FIG. 1.

The remote pumping module 70F illustrated in FIG. 6 is different from the remote pumping module 50F (FIG. 4) of the second embodiment in positioning an EDF 71 in a front stage of the circulator 51 and amplifying the signal light before carrying out amplification by the EDF 52.

In addition, a remote pumping module 70R illustrated in FIG. 7 is different from the remote pumping module 50R (FIG. 5) of the second embodiment in positioning an EDF 72 in a front stage of the circulator 58 and amplifying the signal light before carrying out amplification by the EDF 56. In the example being illustrated, the coupler 57 is positioned in front of the EDF 72 and the pumping light is coupled to the signal light by the coupler 57. The coupled signal light and pumping light are inputted to the EDFs 72 and 56 and are reflected by the mirror 59. The signal light and the pumping light are outputted from the module through the circulator 58 and the divider 55.

Incidentally, the EDF 52 according to the third embodiment may have a length that is less than that of the EDF 52 according to the second embodiment by the length of the EDF 71. Similarly, the EDF 56 according to the third embodiment may have a length that is less than that of the EDF 56 according to the second embodiment by the length of the EDF 72.

The EDF module of a so-called double path type which is described in the second embodiment using the circulator and the mirror has a defect in which the noise figure increases in the module because the signal light input end corresponds to the signal light output end in the EDF adjacent to the circulator. In other words, the power of signal light reaches a high level which is approximately equal to the level of pumping light, by amplifying the signal light. As a result, this parameter deteriorates with respect to a population inversion and the noise becomes large. On the other hand, in the third embodiment, the EDFs 71 and 72 carry out front stage amplifications to suppress the increase of noise figures in the EDFs 52 and 56, respectively. As a result, according to the third embodiment, it is possible to reduce the noise figure in comparison to the second embodiment.

Although description is made as regards each of the embodiments of this invention, this invention is not limited to the-above-mentioned embodiments and it is possible to make additions, omissions, replacements, and various changes within the sprit and scope of this invention.

INDUSTRIAL APPLICABILITY

This invention is for use in an optical fiber communication system for amplifying an optical signal in accordance with a remote pumping carried out by a passive remote pumping module which is apart from a linear repeater and a terminal device. This invention is of great value for use in a system in which the gain wavelength region of signal light is set to the L band of EDFA. For example, this invention is suitable for a system using a DSF for preventing four wave mixing, which is a problem occurring in the C band of EDFA. According to this invention, it is possible to improve pumping efficiency in the remote pumping module and to reduce a noise figure in the remote pumping module, since the pumping light is inputted from both ends of the erbium-doped fiber.

The invention claimed is:

1. An optical fiber communication system comprising:
   a signal light output device which outputs signal light having a wavelength in a wavelength band of 1570 nm to 1600 nm;
   a plurality of transmission fibers which transmit the signal light outputted from the signal light output device;
   an erbium-doped fiber module which is positioned between the transmission fibers; and
   a signal light reception device which comprises: a pumping light source which outputs pumping light; and a coupler which couples the pumping light to the signal light which is outputted from the signal light output device and which passes through the transmission fibers and the erbium-doped fiber module, and outputs the pumping light in a direction opposite to that in which the signal light is outputted,
   wherein the erbium-doped fiber module comprises:
   a divider which divides the pumping light propagated in the direction opposite to that in which the signal light is propagated in the transmission fibers, from the signal light;
   a branch which branches the pumping light divided by the divider, with a branching ratio of 33% to 67%, and outputs a first pumping light beam which is proximately 33% of the pumping light and a second pumping light beam which is proximately 67% of the pumping light;
   an erbium-doped fiber to which the signal light is inputted;
   a first coupling device which supplies the first pumping light beam branching off from the branch, to the erbium-doped fiber from a signal-light outputting end of the erbium-doped fiber; and
   a second coupling device which couples the signal light to the second pumping light beam branching off from the branch, and supplies the signal light and the second pumping light beam to the erbium-doped fiber from a signal-light inputting end of the erbium-doped fiber.

2. The optical fiber communication system as claimed in claim 1, wherein the first coupling device is a circulator.

3. The optical fiber communication system as claimed in claim 1, further comprising a variable attenuator which is provided between the branch and the first coupling device.

* * * * *